United States Patent [19]

Beeson

[11] Patent Number: 5,676,343
[45] Date of Patent: Oct. 14, 1997

[54] HIGH PRESSURE WATER REGULATING VALVE

[75] Inventor: Charles F. Beeson, Goshen, Ind.

[73] Assignee: Johnson Service Company, Milwaukee, Wis.

[21] Appl. No.: 666,966

[22] Filed: Jun. 20, 1996

[51] Int. Cl.⁶ .................................................. F16K 31/365
[52] U.S. Cl. ................................... 251/61.3; 277/212 R
[58] Field of Search ............................ 251/61.3, 214; 277/212 R, 212 C, 212 F

[56] References Cited

U.S. PATENT DOCUMENTS 2,969,950  1/1961  Gilbert et al. .................... 251/61.3
3,101,191  8/1963  Wolfensperger ................ 277/212 R X
4,305,567  12/1981 Lunt .................................. 251/214

*Primary Examiner*—Kevin Lee
*Attorney, Agent, or Firm*—Harness, Dickey & Pierce, P.L.C.

[57] ABSTRACT

A high pressure water regulating valve is provided having a sealing means capable of withstanding greater interior pressure than previous designs. The valve comprises a base having a passage extending therethrough. The base includes a groove integrally formed in a top surface thereof. An O-ring is situated in the groove and at least one diaphragm is located over the O-ring and the top surface of the base. A pressure plate having a ridge-like clamping bead projecting therefrom is secured to the base such that the diaphragm and O-ring form a seal between the pressure plate and the base.

14 Claims, 3 Drawing Sheets

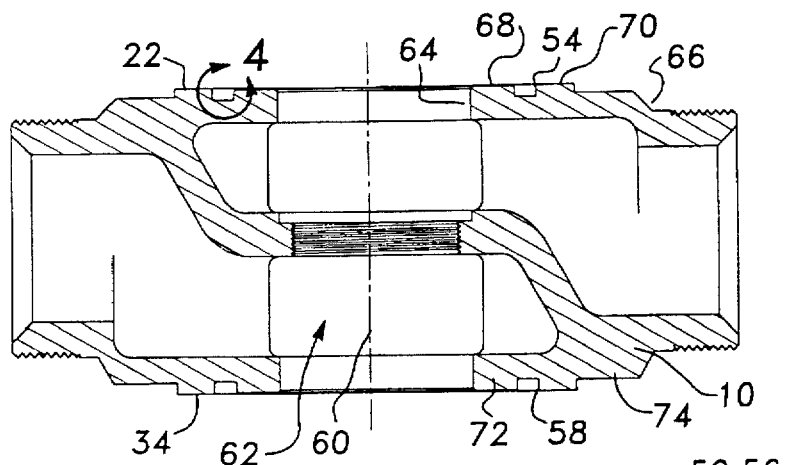
Fig-3
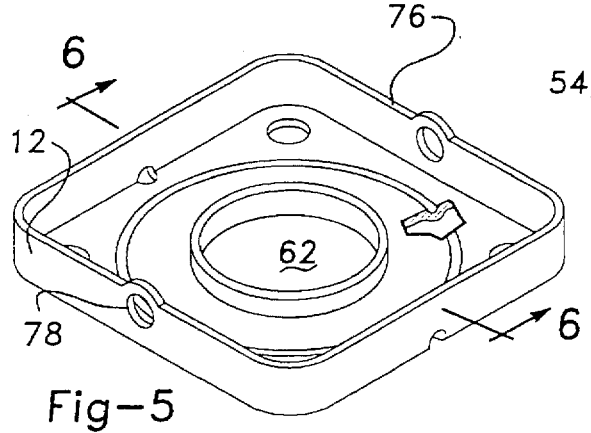
Fig-5
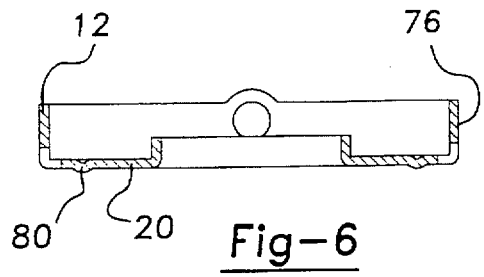
Fig-4
Fig-6
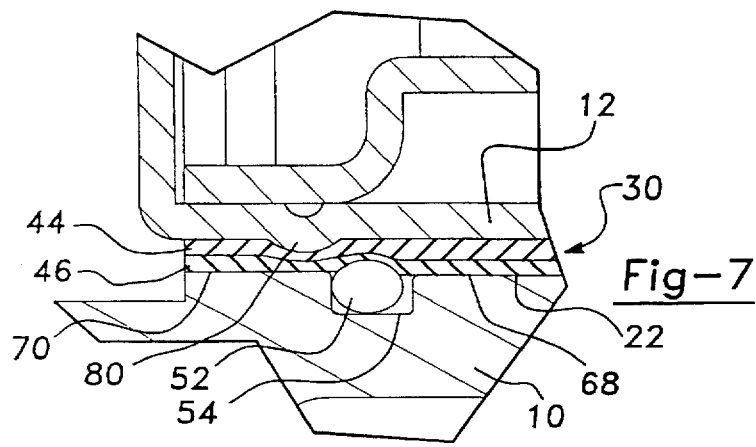
Fig-7

5,676,343

HIGH PRESSURE WATER REGULATING VALVE

BACKGROUND OF THE INVENTION

1. Technical Field

This invention generally relates to high pressure water regulating valves. More particularly, the present invention relates to a sealing arrangement for high pressure water regulating valves.

2. Discussion

As is generally known in the art of high pressure water regulating valves, seals are used between component parts thereof for preventing leaks in the presence of strong water pressure. Conventional valve designs seal construction joints by using screws to clamp rubber diaphragms between a pressure plate and a main body casting. The diaphragms fill the seam and prevent leaks to a threshold level of water pressure from the interior of the valve.

A clamping bead on the pressure plate has been utilized in some designs to increase the holding power of the seal. However, these designs are limited in the amount of pressure that can be held due to the configuration of the sealing means and particularly due to the deterioration of the diaphragm resiliency over time. The clamping force generated from the screws holding the components together is reduced due to dimensional changes as the diaphragm deteriorates and relaxes. Accordingly, the seal becomes weakened.

Previously, these valves were subject to retorquing of the screws in an attempt to regain a sealing ability closer to that available prior to the deterioration. Since these valves are often used to regulate water flow to a condenser on a refrigeration system, any leakage due to improper sealing is a great concern. Therefore, it is desirable to provide a high pressure water regulating valve having a seal between the component parts thereof capable of withholding greater pressure than previous designs as well as improving the quality, reliability and life of the product.

SUMMARY OF THE INVENTION

The above and other objects are provided by a high pressure water regulating valve having a sealing means capable of withstanding greater interior pressure than previous designs. The valve comprises a base having a passage extending therethrough. The base includes a groove integrally formed in at least a top surface thereof. An O-ring is situated in the groove and at least one diaphragm overlaps the O-ring and the top surface of the base. A pressure plate including a downwardly projecting ridge is secured to the base such that the diaphragm and O-ring form a seal between the pressure plate and the base.

BRIEF DESCRIPTION OF THE DRAWINGS

In order to appreciate the manner in which the advantages and objects of the present invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is a cross-sectional view of the base according to the present invention.

FIG. 4 is an enlarged cross-sectional view of the groove according to the present invention.

FIG. 5 is a perspective view of the pressure plate according to the present invention.

FIG. 6 is a cross-sectional view of the pressure plate taken along line 6—6 of FIG. 5.

FIG. 7 is an enlarged cross-sectional view of the sealing means according to the present invention.

DETAILED DESCRIPTION OF THE PREFERRED EMBODIMENTS

Figure 1:
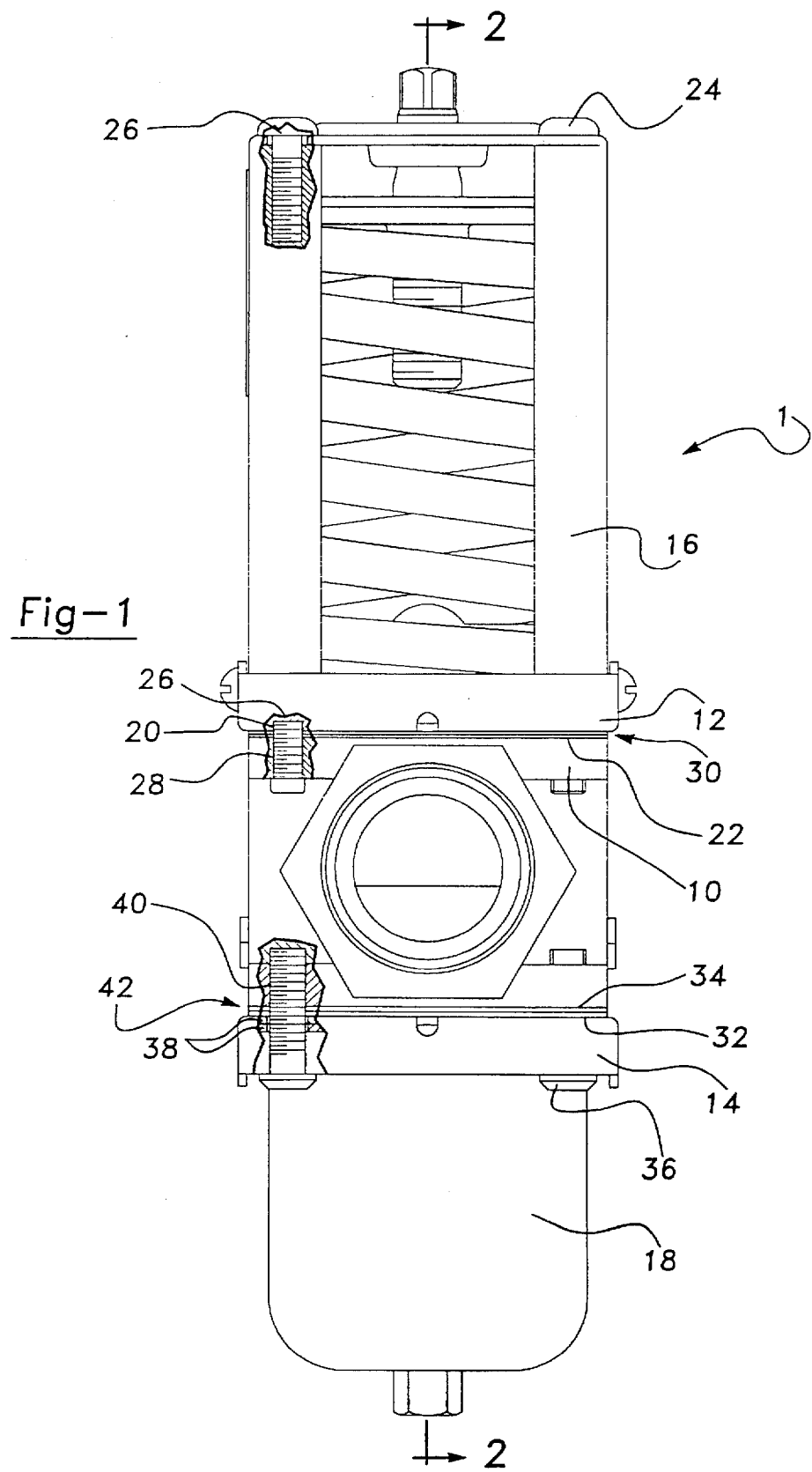
FIG. 1 is a front view with partial cutouts of a high pressure water regulating valve according to the present invention.

In FIG. 1, a water regulating valve implementing the present invention is shown generally at 1. As is known in the art of water regulating valves, the seal between the component parts thereof can weaken over time. The amount of pressure the seal is capable of withholding is therefore reduced. This problem requires subsequent maintenance or replacement to recapture adequate sealing ability. The present invention provides a means for regulating the flow of water at a greater internal pressure than previously provided. Furthermore, the maintenance required of conventional valves is alleviated, thereby providing an improved and more reliable product.

Still referring to FIG. 1, a high pressure water regulating valve 1 includes a base 10 and first and second pressure plates 12, 14 secured thereto. A spring housing 16 is disposed atop the first pressure plate 12. A sensing element housing 18 is disposed below the second pressure plate 14. Although the pressure plates 12, 14 can comprise a variety of materials, case hardened sheet metal such as stamped steel has been found particularly useful.

The first pressure plate 12 includes a substantially square bottom surface 20 adapted to mate with a substantially square top surface 22 of the base 10. The first pressure plate 12 is secured to the base 10 by a plurality of fasteners 24 passing through mounting holes 26 in the spring housing 16 and first pressure plate 12. The fasteners 24 engage threaded holes 28 in the base 10 to secure the components together. Fasteners 24 such as bolts, screws or the like are preferred for this purpose. Disposed between the first pressure plate 12 and the base 10 is a first sealing means generally indicated at 30.

The second pressure plate 14 includes a substantially square top surface 32 adapted to mate with a substantially square bottom surface 34 of the base 10. The second pressure plate 14 is secured to the base 10 by a plurality of fasteners 36 passing through mounting holes 38 in the sensing element housing 18 and second pressure plate 14. The fasteners 36 engage threaded holes 40 in the base 10 to secure the components together. Fasteners 36 such as bolts, screws or the like are preferred for this purpose. Disposed between the second pressure plate 14 and the base 10 is a second sealing means generally indicated at 42.

Figure 2:
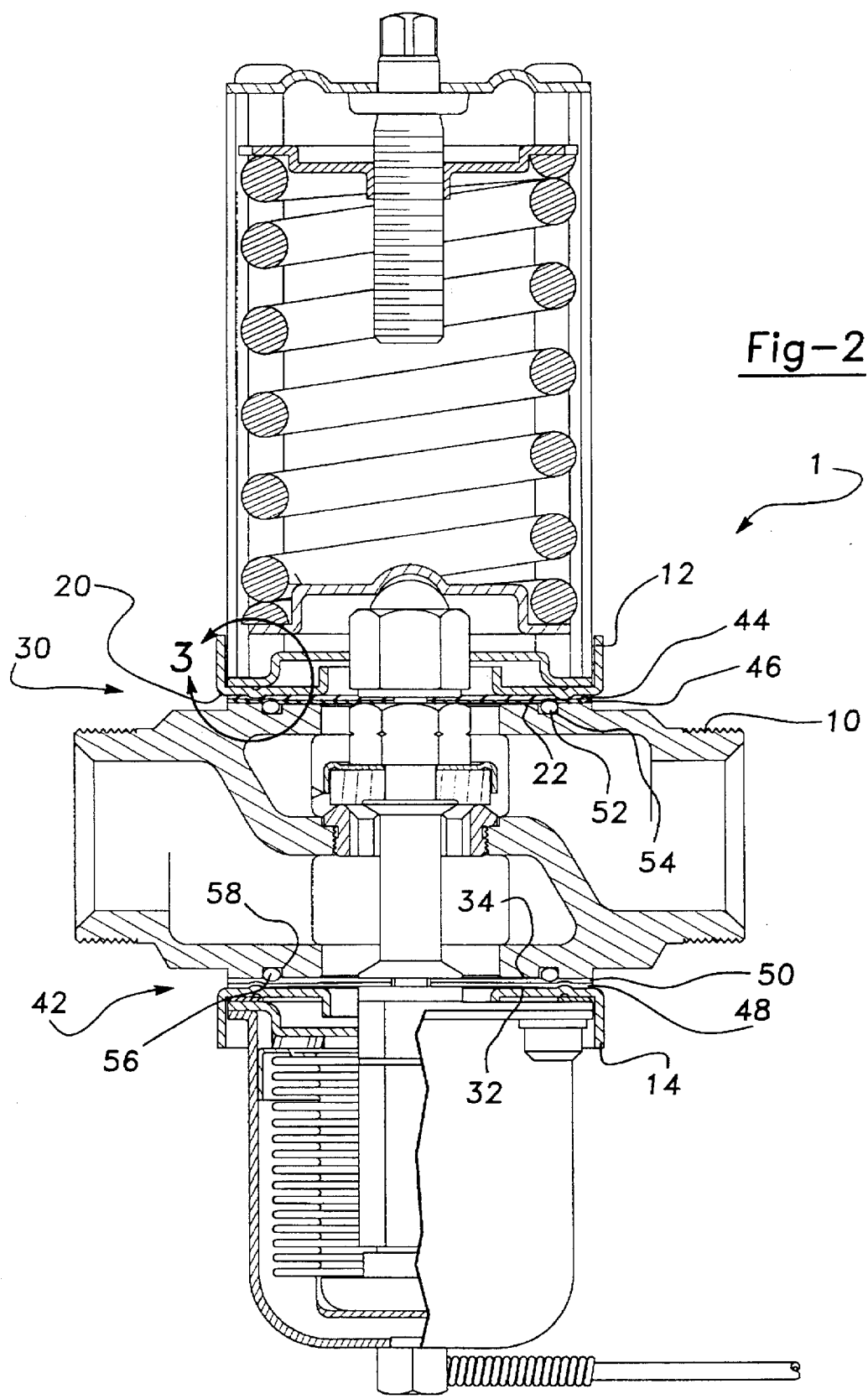
FIG. 2 is a cross-sectional view taken along line 2—2 of the valve of FIG. 1.

Turning to FIG. 2, the high pressure water regulating valve 1 is shown along line 2—2 of FIG. 1 to expose the first and second sealing means 30, 42 located between the first and second pressure plates 12, 14 and the base 10. A first diaphragm 44 is disposed adjacent the bottom surface 20 of the pressure plate 12. A second diaphragm 46 is located adjacent the first diaphragm 44 generally along the top surface 22 of the base 10. Similarly, a first diaphragm 48 is disposed adjacent the top surface 32 of the pressure plate 14. A second diaphragm 50 is located adjacent the first diaphragm 48 generally along the bottom surface 34 of the base 10.

Preferably, the diaphragms are formed of a resilient material so as to flex under pressure. This is especially useful when the diaphragms are subjected to oppositely directed forces as the first and second pressure plates 12, 14 are fastened to the base 10. Most preferably the diaphragms comprise a fabric coated with rubber. Each of the diaphragms preferably includes an opening therein for accommodating components of the valve.

A resilient first O-ring 52 is situated in a first groove 54 in the top surface 22 of the base 10. A resilient second O-ring 56 is situated in a second groove 58 in the bottom surface 34 of the base 10. The first and second O-rings 52, 56 are overlapped by the second diaphragms 46, 50 when the first and second pressure plates 12, 14 are fastened to the base 10. The diaphragms and O-rings cooperate to form a seal between the pressure plates 12, 14 and the base 10 when properly aligned and fastened. Although the grooves 54, 58 are preferably circularly shaped, it should be appreciated that other configurations are possible within the scope of this invention. It should also be noted that the number of diaphragms used in any particular sealing means is a matter of design choice based on the requirements of the valve.

Referring now to FIG. 3, the base 10 of the present invention is shown in greater detail. The base 10 is generally situated along a vertical axis 60. A passage 62 along the vertical axis 60 defines an interior portion 64 and an exterior portion 66 of the base 10. The grooves 54, 58 are formed integrally in the top and bottom surfaces 22, 34 of the base 10, respectively. The groove 54 defines an interior surface 68 and an exterior surface 70 of the top surface 22. Similarly, the groove 58 defines an interior surface 72 and an exterior surface 74 of the bottom surface 34.

As best seen in FIG. 4, it is preferable that the exterior surfaces 70, 74 be slightly raised relative to the interior surfaces 68, 72 when viewed perpendicular to the vertical axis 60. In this way, hook-like shaped grooves 54, 58 are provided for supporting the O-rings 52, 56. This configuration allows fluid to enter into the grooves 54, 58 from the passage 62 to assist sealing by providing outward pressure on the O-rings 52, 56.

In FIG. 5, the pressure plate 12 is shown in greater detail. For better understanding, the following description refers only to the pressure plate 12 and the top surface 22 of the base 10. However, it should be noted that the pressure plate 14 and the bottom surface 34 could substitute therefore. Furthermore, the particular configuration of the valve 1 could be varied within the scope of the present invention. Although not to be interpreted as limiting, such variation could include additional or fewer sealing means or elements as well as variations in materials or dimensions.

Still referring to FIG. 5, the pressure plate 12 includes the passage 62 extending therethrough for accommodating components of valve 1. Upwardly extending walls 76 form the sides of the pressure plate 12. A plurality of holes 78 are provided in the walls 76 for cooperating with screws (not shown) to secure the pressure plate 12 to the spring housing 16 independently of the fasteners 24 described above.

As best seen in FIG. 6, a ridge-like clamping bead 80 projects from the bottom surface 20 of the pressure plate 12. The bead 80 is configured so as to comprise a generally circular ridge-like shaped projection. Preferably the clamping bead 80 has a circumference slightly larger than the groove 54 of the base 10. It should be noted that the clamping bead 80 is preferably formed integrally with the bottom surface 20 of the pressure plate 12 for added durability and ease of manufacture. Additionally, the walls 76 may be formed integrally with the bottom surface 20.

Turning now to FIG. 7, the first sealing means 30 is shown in greater detail. It should be appreciated however that the second sealing means 42 could be substituted therefor. The O-ring 52 is mounted within the groove 54 of the top surface 22 of the base 10. The second diaphragm 46 is situated so as to overlap the O-ring 52 and the top surface 22. The first diaphragm 44 is located so as to overlap the second diaphragm 46.

The pressure plate 12 is positioned immediately over the first diaphragm 44 in a manner such that the bead 80 is aligned substantially opposite the exterior surface 70 of the top surface 22. In this way, the first and second diaphragms 44, 46 are secured between the bead 80 of the pressure plate 12 and the exterior surface 70 of the top surface 22 of the base 10.

The bead 80 of the pressure plate 12 is located slightly outward of the O-ring 52. The exterior section 70 of the top surface 22 cooperates with the bead 80 and the groove 54 to support the O-ring 52 against outward pressure. Water flowing through the valve 1 and passing into the groove 54 over the interior surface 68 generates outward pressure on the sealing means 30. The first and second diaphragms 44, 46 and O-ring 52 are forced outward thereby providing resistance against leakage and enhanced pressure withholding power. In certain applications it may be advantageous to position the groove 54 and thus the O-ring 52 and bead 80 closer to the interior portion 64 than the exterior portion 66 of the base 10.

In operation, the O-ring 52 is forced outwardly upon receiving pressure from the interior of the valve 1. However, outward movement of the O-ring 52 is prevented by the configuration of the groove 54, bead 80 and the exterior surface 70. The pressure enhances the sealing ability by forcing the O-ring 52 into the interface of the second diaphragm 46 and the exterior surface 70. Likewise, outwardly directed pressure forces the first diaphragm 44, second diaphragm 46 and O-ring 52 to deflect enabling them to tighten together to cooperatively provide greater sealing ability.

Thus, it can be appreciated that the present invention provides an enhanced sealing arrangement for high pressure water regulating valves. Also, the necessity for follow-up maintenance as with conventional valves is alleviated. Furthermore, the sealing arrangement of the present invention can withstand greater pressure than previous designs. The present invention also improves the quality, reliability and life of the valve.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A valve comprising:

a base having at least a first surface;

a groove integrally formed in said first surface;

an O-ring located in said groove;

at least one diaphragm overlapping said O-ring;

a pressure plate having a ridge projecting from a bottom surface thereof, said pressure plate being secured to said base in a manner such that said ridge is located outwardly of said O-ring such that said diaphragm and said O-ring cooperatively form a seal along an interface of said pressure plate and said base.

2. The valve of claim 1 wherein said at least one diaphragm further comprises:

a first diaphragm disposed between said base and said pressure plate so as to overlap said O-ring; and at least one other diaphragm overlapping said first diaphragm.

3. The valve of claim 1 wherein said first surface comprises:

an interior surface located interior of said groove; and an exterior surface located exterior of said groove, said exterior surface being raised relative to said interior surface.

4. The valve of claim 1 further comprising:

a second surface of said base;

a second groove integrally formed in said second surface;

a second O-ring located in said second groove;

at least one additional diaphragm overlapping said second O-ring;

a second pressure plate having a second ridge projecting from a top surface thereof, said second pressure plate being secured to said base in a manner such that said second ridge is located outwardly of said second O-ring such that said additional diaphragm and said second O-ring cooperatively form a seal along an interface of said second pressure plate and said base.

5. The valve of claim 4 wherein said at least one additional diaphragm further comprises:

a third diaphragm disposed between said base and said second pressure plate so as to overlap said second O-ring; and at least one other diaphragm overlapping said third diaphragm.

6. The valve of claim 4 wherein said second surface comprises:

a second interior surface located interior of said second groove; and a second exterior surface located exterior of said second groove, said second exterior surface being raised relative to said second interior surface.

7. The valve of claim 4 further comprising:

a spring housing disposed atop said pressure plate; and a sensing element housing disposed below said second pressure plate.

8. A high pressure water regulating valve comprising:

a base having a passage extending therethrough defining an interior portion and exterior portion of said base;

said base including at least a first surface having a groove integrally formed therein defining an interior section and an exterior section of said first surface, said exterior section being raised relative to said interior section for providing a hook-like shape to said groove;

an O-ring mounted in said groove;

a first diaphragm overlapping said O-ring and said first surface;

a second diaphragm adjacent said first diaphragm; and a pressure plate including a ridge projecting downwardly from a bottom surface thereof, said pressure plate being secured to said base such that said ridge is located outward of said O-ring whereby said first and second diaphragms and said O-ring form a seal at an interface of said pressure plate and said base.

9. The valve of claim 5 wherein said first and second diaphragms include an opening therein.

10. The valve of claim 8 further comprising:

a second surface of said base having a second groove integrally formed therein defining a second interior section and a second exterior section of said second surface, said second exterior section being raised relative to said second interior section for providing a hook-like shape to said second groove;

a second O-ring mounted in said second groove;

a third diaphragm overlapping said second O-ring and said second surface;

a fourth diaphragm adjacent said third diaphragm; and a second pressure plate including a second ring projecting upwardly from a top surface thereof, said second pressure plate being secured to said base such that said second ridge is located outward of said second O-ring such that said third and fourth diaphragms and said second O-ring form a seal at an interface of said second pressure plate and said base.

11. The valve of claim 10 further comprising:

a spring housing disposed atop said pressure plate; and a sensing element housing disposed below said second pressure plate.

12. A high pressure water regulating valve for regulating the flow of water to a water cooled condenser on a refrigeration system comprising:

a base having a passage extending therethrough defining an interior portion and an exterior portion;

a first surface of said base having a generally circular groove integrally formed therein defining an interior section and an exterior section of said first surface, said exterior section being raised relative to said interior section to give said groove an essentially hook-like cross-sectional shape;

a resilient O-ring mounted in said groove;

a first rubberized diaphragm overlapping said O-ring and said first surface;

said first diaphragm having an opening therethrough;

a second rubberized diaphragm adjacent said first diaphragm;

said second diaphragm having an opening therethrough;

a pressure plate having a bottom surface and upwardly extending circumferential walls;

an integrally formed generally circular ridge-like projection extending from said bottom surface having a circumference greater than a circumference of said groove; and said pressure plate being secured to said base such that said ridge-like projection is positioned outward of said O-ring.

13. The valve of claim 12 further comprising:

a second surface of said base having a generally circular second groove integrally formed therein defining a second interior section and a second exterior section of said second surface, said second exterior section being raised relative to said second interior section to give said second groove an essentially hook-like cross-sectional shape;

a resilient second O-ring mounted in said second groove;

a third rubberized diaphragm overlapping said second O-ring and said second surface;

said third diaphragm having an opening therethrough;

a fourth rubberized diaphragm adjacent said third diaphragm;

said fourth diaphragm having an opening therethrough;

a second pressure plate having a top surface and downwardly extending circumferential walls;

an integrally formed generally circular second ridge-like projection extending from said top surface having a circumference greater than a circumference of said second groove; and said second pressure plate being secured to said base such that said second ridge-like projection is positioned outward of said second O-ring.

14. The valve of claim 13 further comprising:

a spring housing disposed atop said pressure plate; and a sensing element housing disposed below said second pressure plate.

* * * * *

UNITED STATES PATENT AND TRADEMARK OFFICE
CERTIFICATE OF CORRECTION

PATENT NO.   : 5,676,343
DATED        : October 14, 1997
INVENTOR(S)  : Charles F. Beeson It is certified that error appears in the above-identified patent and that said Letters Patent is hereby corrected as shown below:

Column 6, line 5, claim 9,
    "claim 5" should be --claim 8--.

Signed and Sealed this

Third Day of March, 1998

Attest:

BRUCE LEHMAN

Attesting Officer     Commissioner of Patents and Trademarks